United States Patent [19]

Cracraft

[11] Patent Number: 4,901,507
[45] Date of Patent: Feb. 20, 1990

[54] PIVOTED DECK LAWNMOWER

[76] Inventor: Larry D. Cracraft, Rt. #3 Box 165, Maryville, Mo. 64468

[21] Appl. No.: 279,510

[22] Filed: Dec. 5, 1988

[51] Int. Cl.[4] .................. A01D 34/66; A01D 34/86; A01D 75/30
[52] U.S. Cl. .......................................... 56/6; 56/15.9; 56/235
[58] Field of Search .................. 56/6, 15.6, 16.2, 14.9, 56/208, 209, 235, 255, 15.9

[56] References Cited

U.S. PATENT DOCUMENTS

| | | | |
|---|---|---|---|
| 3,375,645 | 4/1968 | Miller | 56/68.2 |
| 3,404,518 | 10/1968 | Kasper | 56/6 X |
| 3,418,790 | 12/1968 | Whitfield et al. | 56/6 |
| 3,465,505 | 9/1969 | Krinke | 56/320.1 |
| 3,473,302 | 10/1969 | Caldwell | 56/6 |
| 3,654,750 | 4/1972 | Lely | 56/16.2 |
| 4,266,395 | 5/1981 | Basham | 56/209 |
| 4,442,658 | 4/1984 | Cartner | 56/6 X |
| 4,497,160 | 2/1985 | Mullet et al. | 56/13.6 X |
| 4,621,696 | 9/1986 | Brouwer | 56/68.2 X |

Primary Examiner—Stephen J. Novosad
Attorney, Agent, or Firm—Leon Gilden

[57] ABSTRACT

A lawnmower of a type utilized in conjunction with a self-propelled vehicle, such as tractor, includes a plurality of decks, each housing a plurality of rotating cutting blades wherein the plurality of decks are pivotally secured and adjustable relative to one another to accommodate various ground contours.

9 Claims, 4 Drawing Sheets

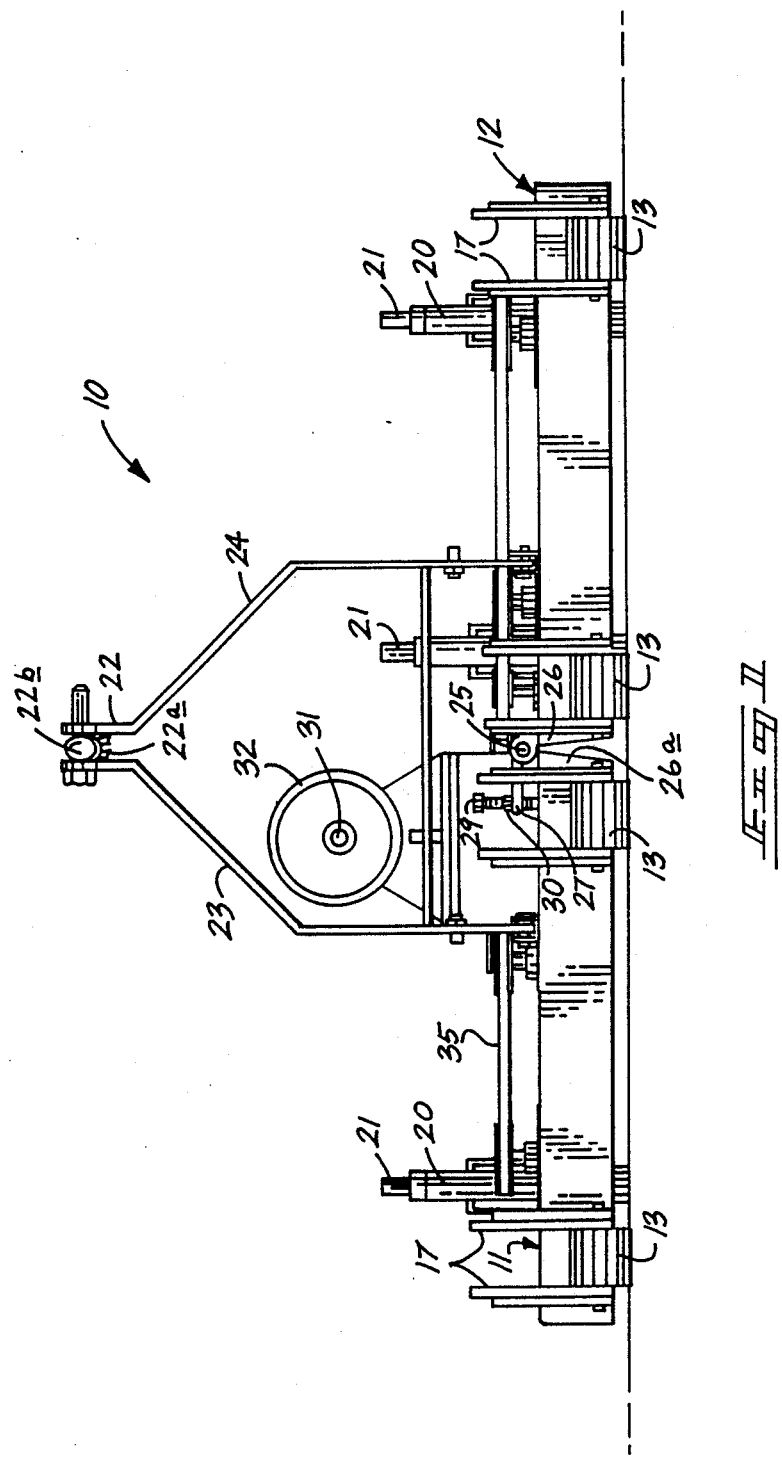

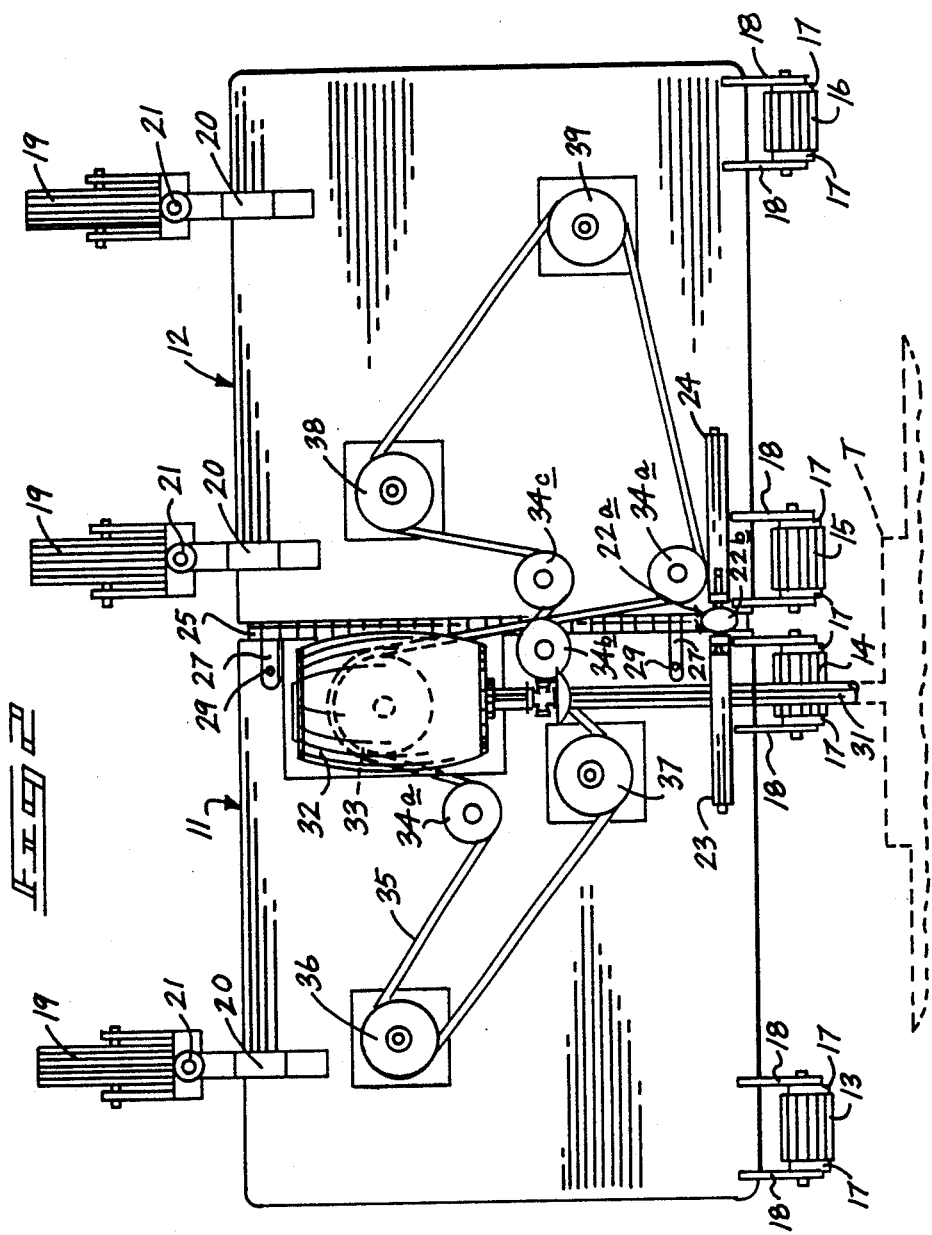

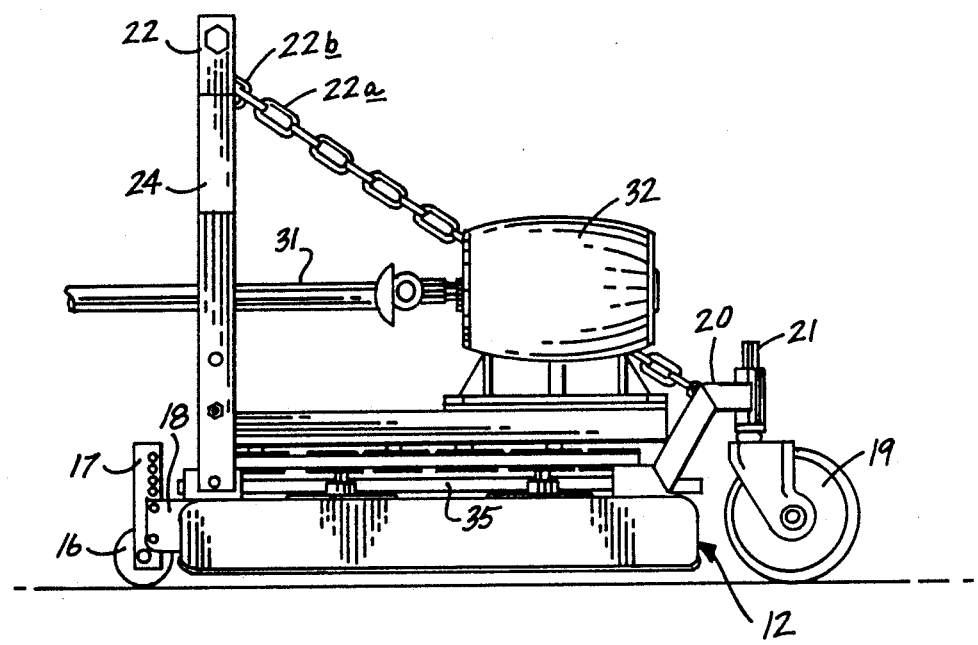

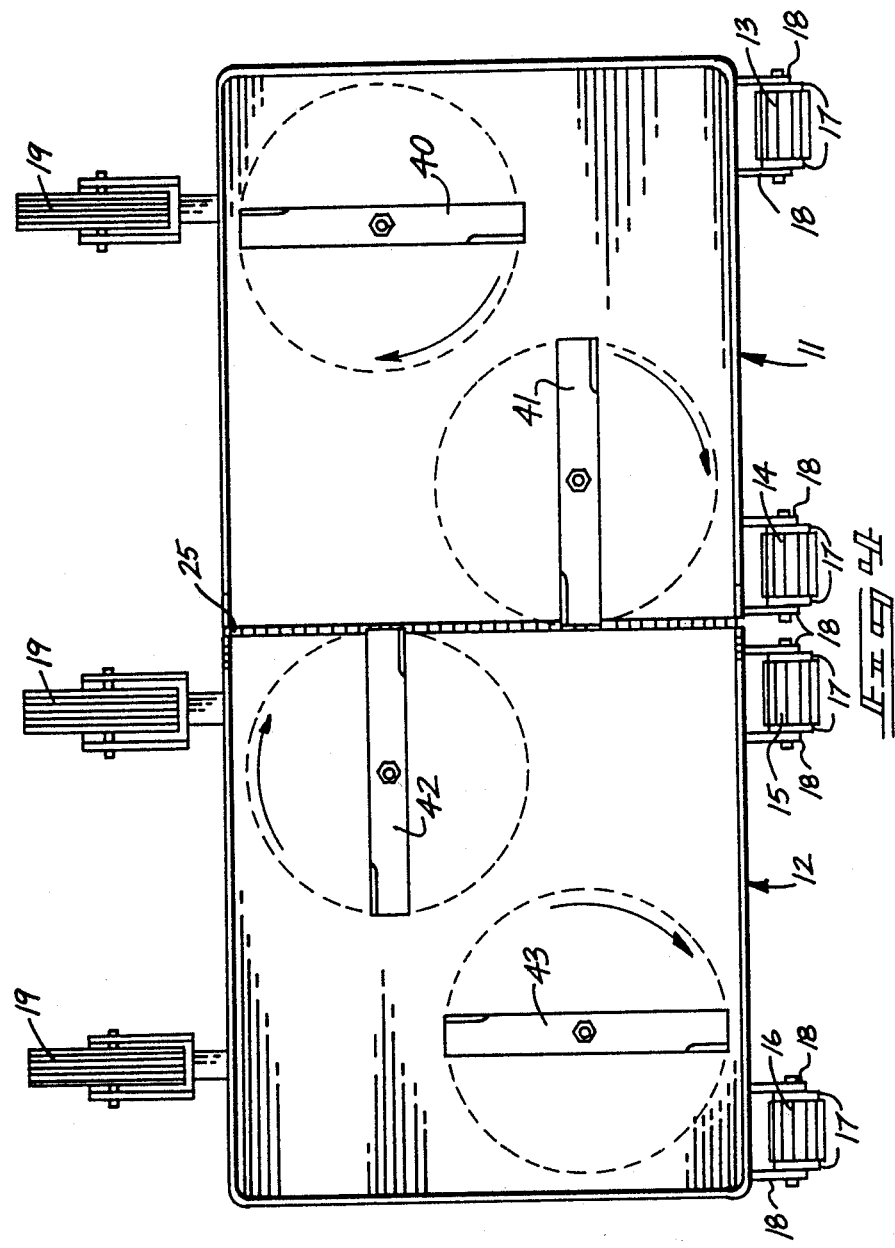

PIVOTED DECK LAWNMOWER

BACKGROUND OF THE INVENTION

1. Field of the Invention

The field of invention relates to lawnmowers, and more particularly pertains to a new and improved pivoted deck lawnmower wherein the same includes a plurality of housings pivoted together to accommodate various ground contours while cutting a large swathe of lawn.

2. Description of the Prior Art

The use of lawnmowers of the "estate type" are well known in the prior art. Typically, these lawnmowers are utilized to cut large tracts of grass and accordingly are of a size commensurate for the task. Lawnmowers of the past have frequently been of a construction to include a single housing with a plurality of cutting blades therein wherein a traverse of such large ground does not readily accommodate ground contours that may fall within the perimeter of a large lawnmower deck. For example, U.S. Pat. No. 3,654,750 to Van Der Lely illustrates a longitudinally aligned mowing machine utilizing forward skids and rearwardly mounted wheels with a plurality of decks pivotally associated with one another wherein each deck includes a single axially mounted rotating blade organization, as opposed to the instant invention utilizing a plurality of rotating cutting members associated with each deck, a pivoting hinge associated between a plurality of decks, and a drive shaft for the decks generally centrally mounted of the decks and parallel to the axial pivoting of the decks, as opposed to the Van Der Lely patent.

U.S. Pat. No. 3,465,505 to Krinke sets forth a lawnmower housing wherein the wheel support structure is pivotally mounted to the housing to enable pivoting of the housing relative to a ground surface contour.

U.S. Pat. No. 3,375,645 to Miller wherein the rotary blade and a guard associated therearound is tiltably mounted about a centrally longitudinal extending axis to maintain the guard generally parallel to a ground surface to be mowed.

U.S. Pat. No. 4,621,696 to Bruwer sets forth a harvesting machine wherein a sod cutting head is pivotally connected to a frame associated with a front pivot shaft formed with an axis aligned along the path of travel and a plurality of rear pivots positioned rearwardly of the cutting head wherein the rear pivots are mounted such that they are formed to have the same effect as a horizontal rear pivot shaft located and aligned with the front pivot shaft.

U.S. Pat. No. 4,266,395 to Basham sets forth a harvesting machine that is tiltably mounted relative to the throat or intake of the harvesting machine about a lower longitudinally extending pivot located proximate the forward section of the throat such that various ground contours may be accommodated between opposed lateral ends of the header of the combine or harvesting device.

As such, it may be appreciated that there is a continuing need for a new and improved pivoted deck lawnmower which accommodates variations in ground contour and may be centrally disposed rearwardly of a self-propelled vehicle and as such, the present invention substantially fulfills that need.

SUMMARY OF THE INVENTION

In view of the foregoing disadvantages inherent in the known types of pivoted deck lawnmowers now present in the prior art, the present invention provides a pivoted deck lawnmower wherein the same includes a plurality of pivotally mounted lawnmower decks disposed along either side of a pivot axis wherein said pivot axis is aligned generally parallel with a drive shaft associated with a forwardly mounted self-propelled vehicle to enable enhanced control and guidance of the apparatus. As such, the general purpose of the present invention, which will be described subsequently in greater detail, is to provide a new and improved pivoted deck lawnmowers which has all the advantages of the prior art pivoted deck lawnmower and none of the disadvantages.

To attain this, the present invention includes a plurality of lawnmower deck housings wherein each housing includes a plurality of axes each supporting a cutting means. The plural decks are pivotally mounted wherein the degree of pivotment between the decks is controlled by means of a plurality of limiting devices to avoid binding of the drive mechanism of the invention. Further, the axis of pivotment is aligned generally parallel to the drive shaft axis of the instant invention to enhance control of the apparatus in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pivoted deck lawnmower which has all the advantages of the prior art pivoted deck lawnmowers and none of the disadvantages.

It is another object of the present invention to provide a new and improved pivoted deck lawnmower which may be easily and efficiently manufactured and marketed.

It is a further object of the present invention to provide a new and improved pivoted deck lawnmower which is of a durable and reliable construction.

An even further object of the present invention is to provide a new and improved pivoted deck lawnmower which is susceptible of a low cost of manufacture with regard to both materials and labor, and which accordingly is then susceptible of low prices of sale to the consuming public, thereby making such pivoted deck lawnmowers economically available to the buying public.

Still yet another object of the present invention is to provide a new and improved pivoted deck lawnmower which provides in the apparatuses and methods of the prior art some of the advantages thereof, while simultaneously overcoming some of the disadvantages normally associated therewith.

Still another object of the present invention is to provide a new and improved pivoted deck lawnmower centrally located relative to a self-propelled vehicle formed with a plurality of decks pivotally associated relative to one another and disposed to either side of the vehicle to provide enhanced control of the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a frontal orthographic view of the instant invention.

FIG. 2 is a top orthographic view of the instant invention.

FIG. 3 is a side orthographic view taken in elevation of the instant invention.

FIG. 4 is a bottom orthographic view of the instant invention.

DESCRIPTION OF THE PREFERRED EMBODIMENT

With reference now to the drawings, and in particular to FIGS. 1 to 4 thereof, a new and improved pivoted deck lawnmower embodying the principles and concepts of the present invention and generally designated by the reference numeral 10 will be described.

More specifically, it will be noted that the pivoted deck lawnmower 10 of the instant invention essentially comprises a first housing deck 11 hingedly and pivotally mounted to a second housing deck 12. The first housing deck mounts a first and second forward support wheel 13 and 14 respectively, while the second housing deck 12 supports a third and fourth forward wheel 15 and 16 respectively. The support wheels are essentially of elongate cylindrical configuration for enhanced support of surface contact during use wherein the support wheels are axially aligned with one another when the first and second housing decks 11 and 12 are aligned with each other. The support wheels are mounted to forwardly extending housing brackets 18 by forward wheel brackets 17 each formed with through-extending apertures to adjust the cutting height of the apparatus by vertical positioning of the support wheels, as may be illustrated in FIG. 3 for example. The apparatus includes a trio of rear wheels 19 that are pivotally mounted about parallel pivoting axles 21 oriented generally orthogonally to the axles of the support wheels 17 wherein the pivoting axles 21 are mounted to rear braces 20 extending upwardly and rearwardly of the respective first and second housing decks 11 and 12, as illustrated in FIGS. 1 through 4.

A yoke 22 is mounted centrally of the elongate pivot hinge 25 coextensive with housings 11 and 12. A first leg 23 of the yoke member 22 is pivotally mounted to housing 11 with a second leg 24 pivotally mounted to housing 12.

With reference to the pivot hinge 25, a pivot axle support housing 26 surroundingly encompasses the elongated pivot axle of the hinge 25 and is secured to housing 12 with a second pivot axle support housing 26a surroundingly encompassing the elongate pivot axle and secured to a housing 11 wherein the first and second pivot axle support housings 26 and 26a are secured to vertical side walls of the housings 11 and 12 in confronting relationship, as illustrated in FIG. 1. A leg 27 is integrally formed to the first pivot axle support housing 26 and wherein a plurality of the legs 27 are utilized, as illustrated in FIG. 2 for example, in an overlying parallel relationship to a top surface of the first housing 11. The legs 27 are formed with adjustment screws 29 threaddedly therethrough with associated lock nuts 30. As illustrated in FIG. 1, it may be appreciated that the lower terminal surface of the adjustment screws 29 are spaced somewhat from the top surface of housing 11 to limit pivoting of housing 11 relative to housing 12 whereupon the limiting of the relative motion between the housings will avoid excessive of angularity between the various drive pulleys of the various housings and any binding that may occur between the housings during use.

A drive shaft 31 powered by a self-propelled vehicle "T", typically a tractor, is mechanically associated with a gear multiplication housing 32 by means of a "U" joint. The gear multiplication housing 32 employs gearing of a two to one ratio to enhance the speed of the associated cutting blades of the apparatus. A central drive pulley 33 is in underlying relationship to the housing 32 with a continuous belt 35 operatively positioned about the idler pulleys 34a, 34b, 34c, and 34d with a pair of idler pulleys associated with each housing, as illustrated in FIG. 2 for example. Housing 11 supports a first and second cutter pulley 36 and 37 with housing 12 supporting a third and fourth cutter pulley 38 and 39. The pulleys are fixedly secured to centrally oriented axles. Reference to FIG. 4 illustrates the respective first, second, third, and fourth rearward blades 40, 41, 42, and 43 associated with respective pulleys 36 through 39. It may further be noted that a chain in FIG. 3 illustrates the use of maintaining the yoke 22 in position prior to use with a hook 22b fixedly secured to yoke 22. When in use, the chain 22a is merely disassociated from hook 22b whereupon yoke 22 is coupled to the tractor "T" for associating the apparatus with the tractor. It should be noted that in use of the instant invention, the first and second housings 11 and 12 are medially aligned behind the pulling vehicle "T" with the drive shaft 31 disposed generally parallel to the pivot hinge 25.

The use and operation of the instant invention therefore should be apparent from the above disclosure and accordingly no further discussion relative to the manner of use and operation of the instant invention will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A mowing apparatus for connection to a self-propelled vehicle comprising,
    a first housing defining a first cavity, and a second housing defining a second cavity, and
    cutting means rotatably mounted within said first and second cavities for mowing of grass wherein said cutting means include at least one rotatable blade within each of said first and second cavities fixedly and rotatably secured to a shaft, and
    each shaft projects upwardly through said first and second housings terminating in a pulley, and
    an elongate drive shaft directed forwardly of said first and second housings for attachment to a power source at a forward end of said drive shaft, and
    a gear housing secured to said first housing wherein said drive shaft is secured to said gear housing at its other end, and
    said gear housing operably associated with each pulley of said cutting means for imparting rotation to said pulleys, and
    elongate hinge means securing said first and second housing together, and
    wherein said drive shaft is orientated parallel to said hinge, and
    a yoke member projecting upwardly of a forward surface of said first and second housings positioned medially of said hinge means, and
    a plurality of first wheels secured to rear surfaces of said first housing and a plurality of second wheels secured to rearward surfaces of said first and second housings wherein said first and second wheels rotatably support said first and second housings for traverse over a surface to be mowed and,
    wherein said yoke member includes a connector for connection to a self-propelled vehicle, and wherein said yoke further includes a plurality of legs wherein a first leg is secured to said first housing and a second leg secured to said second housing positioning said yoke medially relative to said elongate hinge.

2. A mowing apparatus as set forth in claim 1 wherein said elongate hinge is coextensively secured to adjacent surfaces of said first and second housings, and
    said hinge further includes at least one leg secured to said hinge and projecting and overlying said first housing parallel to an upper surface of said housing and formed with a threaded through-extending aperture, and
    an adjustment screw threadedly mounted through said through-extending aperture oriented orthogonally relative to said upper surface of said first housing for creating an abutment surface with said first housing to limit pivoting of said first housing relative to said second housing.

3. A mowing apparatus as set forth in claim 2 wherein said second wheels are adjustably mounted to said first and second housing including a plurality of bracket members provided with through extending apertures to orient said second wheels relative to said first and second housings.

4. A mowing apparatus as set forth in claim 3 wherein said second wheels include generally cylindrical rotatable members whose axes are aligned relative to each rotatable member.

5. A mowing apparatus as set forth in claim 4 wherein said first wheels are secured to pivot shafts wherein said pivot shafts are oriented generally orthogonally to upper surfaces of said first and second housings and wherein said pivot shafts of each of said first wheels are aligned.

6. A mowing apparatus as set forth in claim 5 wherein said gear housing includes gear reducing gear means effecting a two to one gear ratio advantage and wherein said gear housing is secured to a central pulley wherein an endless belt is secured about said central pulley and said pulleys are associated with said cutting means for rotation of said cutting means upon rotation of said central pulley.

7. A mowing apparatus as set forth in claim 6 wherein said drive shaft is aligned parallel to said elongate hinge means.

8. A mowing apparatus as set forth in claim 7 wherein said yoke includes a hook releasably securing a chain for selectively securing said yoke in a vertical orientation relative said first and second housings when not in use.

9. A mowing apparatus as set forth in claim 8 wherein said drive shaft is operably associated with said gear housing at its other end by a universal joint.

* * * * *